United States Patent
Ludwig

(10) Patent No.: US 10,514,443 B2
(45) Date of Patent: Dec. 24, 2019

(54) METHOD FOR EVALUATING RADAR RADIATION, AND RADAR APPARATUS

(71) Applicant: Robert Bosch Gmbh, Stuttgart (DE)

(72) Inventor: Stephan Ludwig, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 15/716,637

(22) Filed: Sep. 27, 2017

(65) Prior Publication Data

US 2018/0088212 A1 Mar. 29, 2018

(30) Foreign Application Priority Data

Sep. 28, 2016 (DE) .................. 10 2016 218 643

(51) Int. Cl.
| | | |
|---|---|---|
| *G01S 7/40* | (2006.01) | |
| *G01S 13/56* | (2006.01) | |
| *G01S 13/87* | (2006.01) | |

(52) U.S. Cl.
CPC .......... *G01S 7/4021* (2013.01); *G01S 7/4008* (2013.01); *G01S 7/4017* (2013.01); *G01S 7/4026* (2013.01); *G01S 13/56* (2013.01); *G01S 13/878* (2013.01)

(58) Field of Classification Search
CPC ...... G01S 7/4021; G01S 7/354; G01S 7/4008; G01S 7/4017; G01S 7/4026; G01S 13/56; G01S 13/878; G01S 7/023; G01S 2007/356; G01S 2007/358
USPC ....................................................... 342/165
See application file for complete search history.

(56) References Cited

U.S. PATENT DOCUMENTS

| | | | | |
|---|---|---|---|---|
| 3,727,220 A | * | 4/1973 | Brennan ............... | G01S 7/2923 342/89 |
| 3,731,311 A | * | 5/1973 | Williams ................ | G01S 13/28 342/201 |
| 4,670,854 A | * | 6/1987 | Mossberg ............... | G06E 3/003 359/285 |
| 4,800,891 A | * | 1/1989 | Kim ........................ | A61B 8/06 600/455 |
| 5,184,134 A | * | 2/1993 | Niho ................... | G01S 13/9011 342/25 D |

(Continued)

FOREIGN PATENT DOCUMENTS

| | | | | |
|---|---|---|---|---|
| CA | 2031719 C | * | 2/2002 | ............... H01Q 3/26 |
| EP | 0128542 B1 | | 2/1989 | |

(Continued)

OTHER PUBLICATIONS

Wang et al., "Differential Coherent Algorithm Based on Fast Navigation-Bit Correction for Airborne GNSS-R Software Receivers," Tsinghua Science and Technology, 18(1), 2013.

(Continued)

*Primary Examiner* — Timothy A Brainard
*Assistant Examiner* — Nuzhat Pervin
(74) *Attorney, Agent, or Firm* — Norton Rose Fullbright US LLP; Gerard Messina

(57) ABSTRACT

A method for evaluating radar radiation. A plurality of radar waves are received, and respective individual measured signals are outputted in a complex form. A total measured signal is ascertained and outputted by respective weighted summation of at least one product of each individual measured signal times a respective conjugatedly complex individual measured signal.

9 Claims, 2 Drawing Sheets

(56) References Cited

U.S. PATENT DOCUMENTS

| | | | | |
|---|---|---|---|---|
| 5,200,754 | A * | 4/1993 | Niho | G01S 13/9011 342/25 D |
| 5,398,259 | A * | 3/1995 | Tsujimoto | H04L 25/03057 333/18 |
| 5,570,691 | A * | 11/1996 | Wright | G01S 7/52049 600/447 |
| 5,999,561 | A * | 12/1999 | Naden | H04B 1/707 375/142 |
| 7,129,888 | B1 * | 10/2006 | Chesley | G01S 7/2813 342/159 |
| 8,912,946 | B2 * | 12/2014 | Yanagihara | G01S 13/874 342/22 |
| 9,244,156 | B1 * | 1/2016 | Tardif | G01S 5/0221 |
| 9,599,713 | B2 * | 3/2017 | Giger | G01S 17/10 |
| 2005/0035894 | A1 * | 2/2005 | Dean | H04B 7/0848 341/155 |
| 2005/0228841 | A1 * | 10/2005 | Grobert | G01S 19/21 708/422 |
| 2009/0033538 | A1 * | 2/2009 | Winkler | G01S 7/4008 342/21 |
| 2011/0298652 | A1 * | 12/2011 | Yanagihara | G01S 13/003 342/146 |
| 2012/0242535 | A1 * | 9/2012 | Kanamoto | G01S 3/74 342/158 |
| 2014/0307248 | A1 * | 10/2014 | Giger | G01S 17/10 356/5.01 |
| 2016/0131742 | A1 * | 5/2016 | Schoor | H01Q 1/3233 342/128 |

FOREIGN PATENT DOCUMENTS

| | | | | |
|---|---|---|---|---|
| EP | 544280 A1 * | 11/1992 | | G01S 13/90 |
| EP | 0837334 A2 * | 4/1998 | | G01R 29/0892 |
| EP | 0809811 B1 * | 7/2001 | | G01S 13/4418 |
| EP | 1905352 A1 * | 4/2008 | | A61B 5/14546 |
| WO | WO-2013083269 A2 * | 6/2013 | | G01S 13/003 |

OTHER PUBLICATIONS

Villanti et al., "Differential post-detection integration techniques for robust code acquisition," IEEE Transactions on Communications, 55(11), 2007.

* cited by examiner

METHOD FOR EVALUATING RADAR RADIATION, AND RADAR APPARATUS

CROSS REFERENCE

The present application claims the benefit under 35 U.S.C. § 119 of German Patent Application No. DE 102016218643.4 filed on Sep. 28, 2016, which is expressly incorporated herein by reference in its entirety.

FIELD

The present invention relates to a method for evaluating radar radiation and to a radar apparatus.

BACKGROUND INFORMATION

In order to detect objects using radar, the reflected radar waves are received and a decision is made, based on sampled values in a two-dimensional spectrum, as to whether a reflecting object is located at specific cell positions (cell under test, CUT). The underlying threshold values on the basis of which an object is recognized are very important in this context. If the threshold values are too high, there is a risk that real objects will not be recognized. Conversely, with threshold values that are too low it is possible that nonexistent objects will be erroneously recognized, since background noise will already be recognized as an object.

It is therefore important to improve signal quality prior to detection, and to achieve the highest possible signal-to-noise ratio (SNR).

In order to improve the signal-to-noise ratio, radar waves from several sources can be evaluated simultaneously. One possibility for evaluation involves coherent integration, for example as described in European Patent No. EP 0 128 542 B1.

A differential combination method is described in the paper Wang et al., "Differential Coherent Algorithm Based on Fast Navigation-Bit Correction For Airborne GNSS-R Software Receivers," Tsinghua Science and Technology, 18(1), 2013.

An alternative evaluation of signals by differential evaluation, for application to radio data transmission and navigation systems, is described in the paper Villanti et al., "Differential post-detection integration techniques for robust code acquisition," IEEE Transactions on Communications, 55(11), 2007.

SUMMARY

The present invention provides a method for evaluating radar beams, and a radar apparatus.

According to a first aspect the present invention, a method is provided for evaluating radar radiation, a plurality of radar waves, i.e., at least two radar waves, being received. A respective individual measured signal, in a complex form or in a complex representation, is outputted for each received radar wave. A total measured signal is ascertained and outputted by respective weighted summation of at least one product of each individual measured signal times a respective conjugatedly complex individual measured signal. Products of individual measured signals times conjugatedly complex individual measured signals are thus calculated, and those products are weighted and summed.

According to a second aspect the present invention, a radar apparatus is provided which has a receiver device that is embodied to receive radar waves and to output respective individual measured signals in a complex form. An evaluation device of the radar apparatus is embodied to ascertain and output a total measured signal by respective weighted summation of at least one product of each individual measured signal times a respective conjugatedly complex individual measured signal.

Preferred embodiments are described herein.

Coherent integration is very demanding in terms of the phase differences between the various radar wave signals, which nevertheless vary because of phase noise, an indeterminate carrier phase, or phases that change over time. The present invention provides a method that supplies a precise result regardless of the exact phase differences. As a result of the multiplication of the individual measured signals by conjugatedly complex individual measured signals, the substantially identically sized phase rotations of the radar waves that occur during propagation of the radar waves are cancelled out. The signal-to-noise ratio is better than with incoherent integration, since noise interference effects between the reception paths as a rule are statistically independent of one another. If a received signal or individual measured signal $x_n = z_n + r_n$ is made up of a useful signal $z_n$ and an interfering noise signal $r_n$, the noise power of the interference signal $z_n \cdot r^*_i + r_n \cdot r^*_i$, which results from the conjugatedly complex product $x_n \cdot x^*_i$ of the noisy received signals, then has a lower variance than if the absolute value of a noise variable were calculated in the context of incoherent integration. For details, the reader may be referred to the document Villanti et al. cited above.

Real parts of the products, rather than the products themselves, can preferably also be respectively summed.

According to a preferred refinement of the method, the radar waves are transmitted and/or received in time-offset fashion, respective products of each individual measured signal times conjugatedly complex individual measured signals of radar waves received adjacently in time also being summed. The phase difference between radar waves adjacent in time is usually small, so that the phase shift during the propagation time of the radar wave can be substantially entirely eliminated by multiplying by a complexly conjugated individual measured signal. A remaining phase difference can preferably be absorbed into weighting factors of the products which preferably are selected correspondingly.

According to a preferred refinement of the method, the weighted products of each individual measured signal times conjugatedly complex individual measured signals of the 2·P neighbors closest in time are also summed. P here is a positive natural number, so that in each case the individual measured signal is also summed with the conjugatedly complex individual measured signal of each of the P preceding radar waves and each of the P following radar waves.

According to a further embodiment of the method, only weighted products of the individual measured signal times the conjugated complex individual measured signal of the directly preceding and/or following radar wave, and/or weighted products times the conjugatedly complex individual measured signal itself, are summed. The weighted square of the absolute value of the individual measured signal, or the weighted product of the individual measured signal times the conjugatedly complex individual measured signal of the radar wave directly adjacent in time, is thus summed in order to determine the individual measured signal.

According to a further embodiment of the method, only weighted products of the individual measured signal times the respective conjugatedly complex individual measured signal of the P' directly preceding radar waves, and weighted products times the conjugatedly complex individual measured signal itself, are summed, P' being a positive natural number.

According to a further embodiment, the radar waves are emitted using a plurality of transmitting antennas before they are received. For measurements using several transmitting and/or receiving antennas, the phase offset remains constant because of the antenna geometry. The respectively identical phase rotation of the radar waves during the propagation time is thus cancelled out by multiplying by a conjugatedly complex individual measurement pair.

According to a further embodiment of the method, the received radar waves are previously emitted in at least partly different frequency bands. Preferably the radar waves having the at least partly different frequency bands are emitted by the same transmitting antenna, so that no phase offset or phase difference occurs due to the radar waves themselves, and the respective phase shift occurring during the propagation time of the radar waves is completely eliminated by the multiplication.

According to a further embodiment, the respective weighting factors of the products are set to be equal to 1. Preferably, however, the weighting factors can also be selected so that the signal-to-noise ratio is optimized.

According to a preferred refinement of the radar apparatus, the emitting device has a plurality of transmitting antennas, and/or the transmitting device is embodied to output radar waves in at least partly different frequency bands, and/or the emitting device is embodied to emit radar waves in time-offset fashion.

Instead of the weighted products, unweighted products can also be summed in each case.

DETAILED DESCRIPTION OF EXAMPLE EMBODIMENTS

The numbering of method steps serves the purpose of clarity, and in general is not intended to imply any specific chronological sequence. In particular, several method steps can also be carried out simultaneously. Different embodiments can be arbitrarily combined with one another to the extent that is appropriate.

Figure 1:
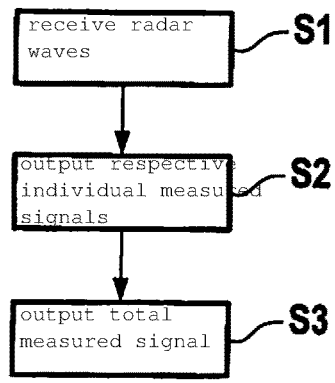
FIG. 1 is a flow chart to explain a method for evaluating radar radiation, according to an embodiment of the present invention.

FIG. 1 is a flow chart of a method for evaluating radar radiation, according to an embodiment of the present invention.

In a first step S1, a plurality of radar waves are received. Preferably the radar waves are previously emitted. The radar waves can be emitted, for example, in time-offset fashion at preferably constant time intervals. Radar waves can furthermore be emitted in different frequency bands that can partly overlap. The radar waves can be emitted in this context by one or by several transmitting antennas. When several transmitting antennas are used they can also, for example, emit radar waves simultaneously.

In a second method step S2, respective individual measured signals $x_n$ are outputted in a complex form or representation for each received radar wave. The individual measured signals $x_n$ have an amplitude and a complex phase.

In a third method step S3, a total measured signal is outputted on the basis of the respective individual measured signals. The total measured signal corresponds to a metric or a sampled value which can be evaluated in order to recognize the presence of an object. According to an embodiment, the total measured signal is constituted by multiplying the individual measured signals $x_n$ by individual measured signal weighting factors $w'_n$, summing the resulting products over all individual measured signals, and taking the square of the absolute value of that sum, i.e. by multiplying by the complexly conjugated variable. This expression can also be represented as a double summation over weighted products of individual measured signals $x_n$ times respective conjugatedly complex individual measured signals $x^*_i$, the products being weighted with weighting factors $w_{ni}$. This is expressed by the following formula:

$$\Lambda = \left| \sum_{n=1}^{N} w'_n x_n \right|^2 = \left( \sum_{n=1}^{N} w'_n x_n \right) \left( \sum_{n=1}^{N} w'^*_n x^*_n \right) = \sum_{n=1}^{N} \sum_{i=1}^{N} w_{ni} x_n x^*_i.$$

The variable N denotes the number of radar waves. The weighting factors $w_{ni} = w'_n \cdot w'^*_i$ can be set, for example, to 1, but can also be predefined as desired. In particular, the weighting factors $w_{ni}$ can be determined in such a way that a signal-to-noise ratio is minimized.

Alternatively, a total measured signal $\Lambda_N$ can be represented by weighted summation of the absolute values of the individual measured signals and of twice the real part of the weighted products of individual measured signals times respective conjugatedly complex individual measured signals, i.e. on the basis of the following formula:

$$\Lambda_N = \sum_{n=1}^{N} \left( w_{nn} |x_n|^2 + 2 \sum_{i=1}^{n-1} \mathrm{Re}(w_{ni} x_n x^*_i) \right).$$

The total measured signal $\Lambda_N$ thus constitutes a real variable whose absolute value can be evaluated in order to determine and recognize objects. In particular, an object can be recognized if the total measured signal $\Lambda_N$ is greater than a predefined value.

According to a preferred embodiment, only products of the total measured signal times itself, and/or times conjugatedly complex individual measured signals of adjacent radar waves, are multiplied. "Adjacent radar waves" can be understood here to mean radar waves that are emitted adjacently in time, for example all P preceding and P following radar waves, where P is a positive number. "Adjacent radar waves" can also encompass radar waves from physically adjacent transmitting antennas, for example from the 2·P physically closest neighbors. In addition, the "adjacent radar waves" can also encompass radar waves of adjoining frequency ranges, for example those 2·P radar waves the center of whose frequency range is located closest to the center of the frequency range of the individual measured signal itself. For example, the total measured signal $\Lambda_P$ can thus be determined as the sum over products of each individual measured signal times conjugatedly complex individual measured signals of the 2·P closest neighbors, i.e. on the basis of the following formula:

$$\Lambda_P = \sum_{n=1}^{N} \left( w_{nn}|x_n|^2 + \sum_{i=n-P, i \neq n}^{n+P} w_{ni} x_n x_i^* \right).$$

where P is a positive natural number, for example P=1, and N is the number of radar waves, for example N=10.

According to a further preferred embodiment, the total measured signal $\Lambda_{P'}$ is calculated by summing the weighted doubled real parts of the products of each individual measured signal $x_n$ times the respective conjugatedly complex individual measured signal $x_n$ of the P' directly preceding radar waves, and weighted products of each individual measured signal $x_n$ times the conjugatedly complex individual measured signal itself, where P' is a positive natural number. For example, P' is between 1 and 10, for instance P' is equal to 1 or 2. The total measured signal $\Lambda_{P'}$ is thus calculated using the following formula:

$$\Lambda_{P'} = \sum_{n=1}^{N} \left( w_{nn}|x_n|^2 + 2 \sum_{i=n-P'}^{n-1} \text{Re}(w_{ni} x_n x_i^*) \right).$$

Figure 2:
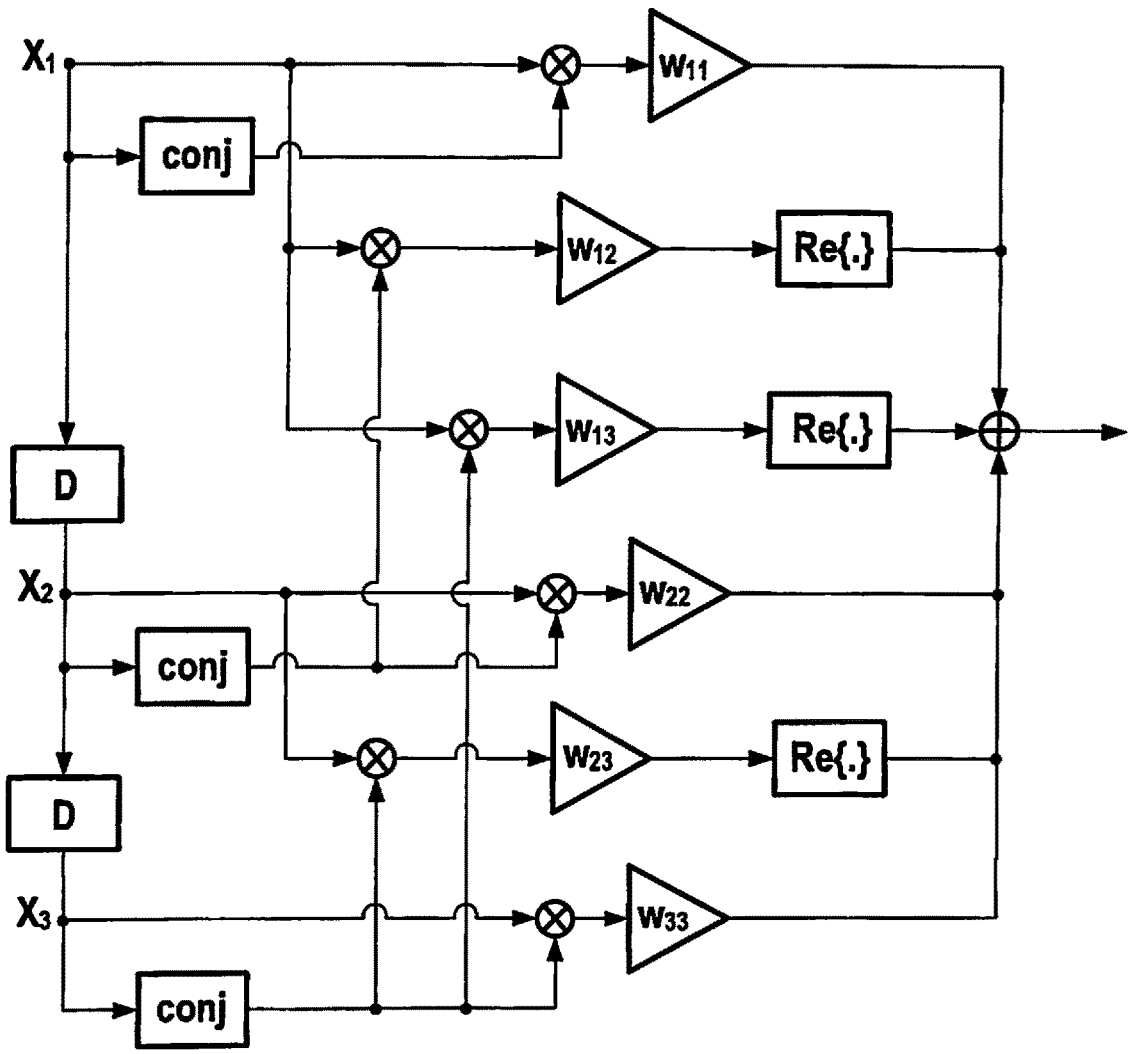
FIG. 2 is a schematic flow chart for generating the total measured signal, according to an exemplifying embodiment.

FIG. 2 is a schematic flow chart illustrating an example of calculation of the total measured signal $\Lambda_{P'}$ for the case in which P'=2. Corresponding individual measured signals $x_1$ to $x_3$ are multiplied by their conjugatedly complex value and multiplied by corresponding weighting factors $w_{11}$ to $w_{33}$. The individual measured signals furthermore are delayed using differentiating members D, and multiplied by the conjugatedly complex value of an individual measured signal different from the individual measured signal, and multiplied by corresponding weighting factors $w_{12}$, $w_{13}$, $w_{23}$, and then the real parts are calculated. All the products constituted in this manner are then summed in order to determine the total measured signal $\Lambda_{P'}$.

Figure 3:
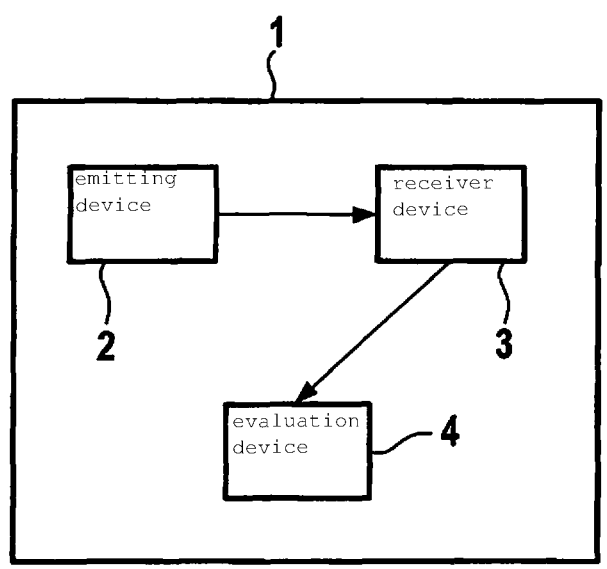
FIG. 3 is a schematic block diagram of a radar apparatus according to an embodiment of the present invention.

FIG. 3 is a block diagram of a radar apparatus 1. Radar apparatus 1 has an emitting device 2 that is embodied to emit a plurality of radar waves. Emitting device 2 can have, for example, a plurality of transmitting antennas for emitting the radar waves. The emitting device can furthermore be embodied to emit radar waves in at least partly different frequency bands. Emitting device 2 can likewise be embodied to emit radar waves in time-offset fashion.

Radar apparatus 1 furthermore has a receiver device 3 that is embodied to receive the reflected radar waves and to output respective individual measured signals in a complex form or representation. An evaluation device 4 of radar apparatus 1 is embodied to ascertain and output a total measured signal by respective weighted summation of at least one product of each individual measured signal times a respective conjugatedly complex individual measured signal. Evaluation device 4 can be embodied to ascertain the total measured signal in accordance with one of the methods indicated above.

Emitting device 2 is optional, and in particular receiver device 3 can also be embodied to receive radar waves from external sources, for example reflected signals from sources for radio broadcasting, satellite navigation, or mobile radio transmission.

What is claimed is:

1. A method for evaluating radar radiation, comprising:
    receiving a plurality of radar waves in time-offset fashion;
    outputting respective individual measured signals, in a complex form, for each of the received radar waves; and
    ascertaining and outputting a total measured signal by summation of a plurality of weighted products, the plurality of weighted products including:
        for each of the individual measured signals, a respective weighted product of the respective individual measured signal times a respective conjugatedly complex of the respective individual measured signal; and
        for each of one or more of the individual measured signals, a respective weighted product of the respective individual measured signal times the respective conjugatedly complex of another of the individual measured signal that is received adjacently, in time, to the respective individual measured signal.

2. The method as recited in claim 1, wherein the weighted products of each individual measured signal times the conjugatedly complex individual measured signals of the 2·P neighbors closest in time are also summed, P being a positive natural number.

3. The method as recited in claim 1, wherein, for each of the individual measured signals, only: (i) weighted products of the individual measured signal times the conjugatedly complex individual measured signal of the directly preceding radar wave and/or following radar wave, and (ii) the weighted product of the individual measured signal times the conjugatedly complex of the individual measured signal are summed.

4. The method as recited in claim 1, wherein, for each of the individual measured signals, only weighted products of the individual measured signal times the respective conjugatedly complex individual measured signals of the P' directly preceding radar waves, and the weighted product of the individual measured signal times the conjugatedly complex of the individual measured signal are summed, P' being a positive natural number.

5. The method as recited in claim 1, wherein the received radar waves are at least one of emitted and received, using a plurality of transmitting antennas.

6. The method as recited in claim 1, wherein the received radar waves are at least one of emitted and received in at least partly different frequency bands.

7. The method as recited in claim 1, wherein respective weighting factors of the products are set to be equal to 1.

8. A radar apparatus, comprising:
    a receiver device that is embodied to receive radar waves in time-offset fashion and to output respective individual measured signals in a complex form for each of the received radar waves; and
    an evaluation device that is embodied to ascertain and output a total measured signal by summation of a plurality of weighted products, the plurality of weighted products including:
        for each of the individual measured signals, a respective weighted product of the respective individual measured signal times a respective conjugatedly complex of the respective individual measured signal; and
        for each of one or more of the individual measured signals, a respective weighted product of the respective individual measured signal times the respective conjugatedly complex of another of the individual measured signal that is received adjacently, in time, to the respective individual measured signal.

9. The radar apparatus as recited in claim 8, further comprising:
- an emitting device that is at least one of: (i) embodied to emit radar waves, the emitting device having a plurality of transmitting antennas, (ii) embodied to output radar waves in at least partly different frequency bands, and (iii) embodied to emit radar waves in the time-offset fashion.

* * * * *